United States Patent
Lille

(10) Patent No.: US 7,343,667 B2
(45) Date of Patent: Mar. 18, 2008

(54) METHODS OF MAKING A SIDE-BY-SIDE READ/WRITE HEAD WITH A SELF-ALIGNED TRAILING SHIELD STRUCTURE

(75) Inventor: Jeffrey Scott Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 419 days.

(21) Appl. No.: 10/955,863

(22) Filed: Sep. 30, 2004

(65) Prior Publication Data

US 2006/0066995 A1   Mar. 30, 2006

(51) Int. Cl.
*G11B 5/127* (2006.01)
*H04R 31/00* (2006.01)

(52) U.S. Cl. .............................. 29/603.16; 29/603.13; 29/603.15; 29/63.18; 216/62; 216/67; 216/68; 360/122; 360/126; 360/317; 360/234.5; 360/234.7

(58) Field of Classification Search ............... 29/603.13–603.16, 603.18; 216/62, 67, 216/66; 360/122, 126, 317, 234.5, 234.7
See application file for complete search history.

(56) References Cited

U.S. PATENT DOCUMENTS

| 4,636,897 | A |   | 1/1987 | Nakamura et al. |   |
|---|---|---|---|---|---|
| 4,740,855 | A |   | 4/1988 | Diepers et al. |   |
| 5,229,901 | A |   | 7/1993 | Mallary |   |
| 5,285,341 | A |   | 2/1994 | Suzuki et al. |   |
| 5,896,249 | A | * | 4/1999 | Fontana et al. | 360/234.5 |
| 6,392,840 | B1 |   | 5/2002 | Chen |   |
| 6,636,390 | B2 |   | 10/2003 | Funayama et al. |   |
| 6,985,330 | B2 | * | 1/2006 | Santini | 360/126 |
| 2003/0112555 | A1 |   | 6/2003 | Sato et al. |   |

(Continued)

FOREIGN PATENT DOCUMENTS

EP    0 821 348 A2    1/1998

(Continued)

OTHER PUBLICATIONS

"Self-Aligned Write Throat/Read Stripe for Side-by-Side Head", IBM Technical Disclosure Bulletin, Aug. 1997, pp. 5-6, vol. 40, Issue-8, web site.

(Continued)

*Primary Examiner*—Paul D. Kim
(74) *Attorney, Agent, or Firm*—John J. Oskorep, Esq.; Rambod Nadar

(57) ABSTRACT

A side-by-side read/write head includes a self-aligned trailing shield, where a rear edge of the trailing shield is defined by the same lithography/etching process used to define a rear edge of a read sensor. A plurality of read sensor layers and a pole tip structure adjacent the read sensor layers are formed over a wafer. A non-magnetic layer is deposited over the pole tip structure. A patterned resist is then formed over both the read sensor layers and the non-magnetic layer. With the patterned resist in place, read sensor materials of the read sensor layers are etched away so as to define the rear edge of the read sensor. Non-magnetic materials of the non-magnetic layer are simultaneously etched away so as to form an etched region which defines the rear edge for the trailing shield.

20 Claims, 8 Drawing Sheets

U.S. PATENT DOCUMENTS

2003/0156355 A1    8/2003   Yoda et al.
2004/0223260 A1*  11/2004   Santini .................. 360/234.7

FOREIGN PATENT DOCUMENTS

| JP | 60163221 | 8/1985 |
|----|----------|--------|
| JP | 62262213 | 11/1987 |
| JP | 6119619  | 4/1994 |

OTHER PUBLICATIONS

"Thin Film Magnetic Head Assembly", IBM Technical Disclosure Bulletin, Sep. 1981, pp. 1912-1913, web site.

"Thin Film Head Assembly With Side by Side Elements", IBM Technical Disclosure Bulletin, Sep. 1981, pp. 1910-1911, web site.

"Design of Separately Optimized Thin Film Read Write Magnetic Recording Heads", IBM Technical Disclosure Bulletin, Oct. 1980, pp. 2148-2149, web site.

* cited by examiner

METHODS OF MAKING A SIDE-BY-SIDE READ/WRITE HEAD WITH A SELF-ALIGNED TRAILING SHIELD STRUCTURE

BACKGROUND

1. Field of the Technology

This invention relates generally to methods of fabricating side-by-side read/write heads with trailing shield structures.

2. Description of the Related Art

Magnetic head assemblies are typically made of multiple thin film layers which are patterned to form various shaped layers in the head. Some of the layers are plated while other layers are sputter deposited on a wafer substrate. The magnetic head may include both a read head portion and a write head portion. The read head portion of a magnetic head assembly includes multiple layers that are typically sputter deposited. For example, the multiple layers of a read sensor, hard bias and lead layers connected to the read sensor, and first and second read gap layers below and on top of the read sensor are typically sputter deposited. On the other hand, the write head portion of the magnetic head includes magnetic pole materials which may be electroplated and non-magnetic layers which may be sputter deposited. The write head portion may be designed as a perpendicular-type recording head which includes a trailing shield which surrounds the pole tip.

Many magnetic head designs utilize a "stacked" approach, where the read head and the write head are formed one after the other in a stacked architecture. Other magnetic head designs utilize a "side-by-side" approach, where the read head and the write head are formed side-by-side in the same plane of the wafer. Side-by-side magnetic heads are typically advantageous in that they can provide for improved electrical, magnetic, and thermal separation between the read head and the write head. If the read head and the write head were to be formed in an aligned fashion in the side-by-side approach, only process windage and mechanical lapping control would define the location of the read and write elements. This would advantageously reduce process variations in terms of the relative orientation of the read head and the write head to the air bearing surface (ABS) plane.

Accordingly, there is a strong-felt need for a method of forming a side-by-side read/write head with a self-aligned trailing shield structure.

SUMMARY

The present application teaches techniques suitable for making a side-by-side read/write head, where the write head is of the perpendicular-recording type. A side-by-side read/write head is one in which the read head and write head are formed side-by-side in the same plane of the wafer. Broadly, a trailing shield of the write head is formed so as to be self-aligned with a read sensor formed for the read head. Specifically, a rear edge of the trailing shield is defined by the same lithography/etch process used to define a rear edge of the read sensor.

In one illustrative method, a plurality of read sensor layers and a pole tip structure adjacent the read sensor layers are formed over a wafer. A first non-magnetic layer (e.g. SiO$_2$) is deposited over the pole tip structure. A first patterned resist is then formed over both the read sensor layers and the first non-magnetic layer. With the first patterned resist in place, read sensor materials of the read sensor layers are etched away so as to define a rear edge of a read sensor. Simultaneously, first non-magnetic materials of the first non-magnetic layer are etched away so as to form an etched region which defines a rear edge for a trailing shield. With the first patterned resist in place, a second non-magnetic layer (e.g. Al$_2$O$_3$) is deposited within the etched region and behind the rear edge of the read sensor structure. After defining a trackwidth (TW) for the read sensor, first non-magnetic materials of the first non-magnetic layer are etched away so as to form an etched trailing shield region which defines the rear edge for the trailing shield. Non-magnetic gap materials are then formed to surround a pole tip of the pole tip structure. Finally, magnetic materials are formed within the etched trailing shield region around the non-magnetic gap materials, for thereby producing the self-aligned trailing shield.

A magnetic head of the present application includes a read head and a write head which is coplanar with the read head. The write head includes a pole tip of the perpendicular recording type being formed at an air bearing surface (ABS) of the magnetic head; a trailing shield structure formed so as to surround the pole tip; and a non-magnetic etchable layer (e.g. an oxide) formed behind the ABS and the trailing shield structure and being coplanar with the trailing shield structure. A read sensor of the read head has a rear edge which may be aligned with or offset from a rear edge of the trailing shield by a predetermined distance. A disk drive of the present application includes one or more magnetic disks; a side-by-side read/write head for reading data from and writing data to the one or more magnetic disks; a slider which supports the side-by-side read/write head; and an actuator arm which supports the slider. The write head includes a pole tip of the perpendicular recording type being formed at an air bearing surface (ABS) of the magnetic head; a trailing shield structure formed so as to surround the pole tip; and a non-magnetic etchable layer (e.g. an oxide) formed behind the ABS and the trailing shield structure and being coplanar with the trailing shield structure. A read sensor of the read head has a rear edge which may be aligned with or offset from a rear edge of the trailing shield by a predetermined distance.

BRIEF DESCRIPTION OF THE DRAWINGS

Other objects and advantages of the invention will become more apparent to those skilled in the art after considering the following detailed description in connection with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
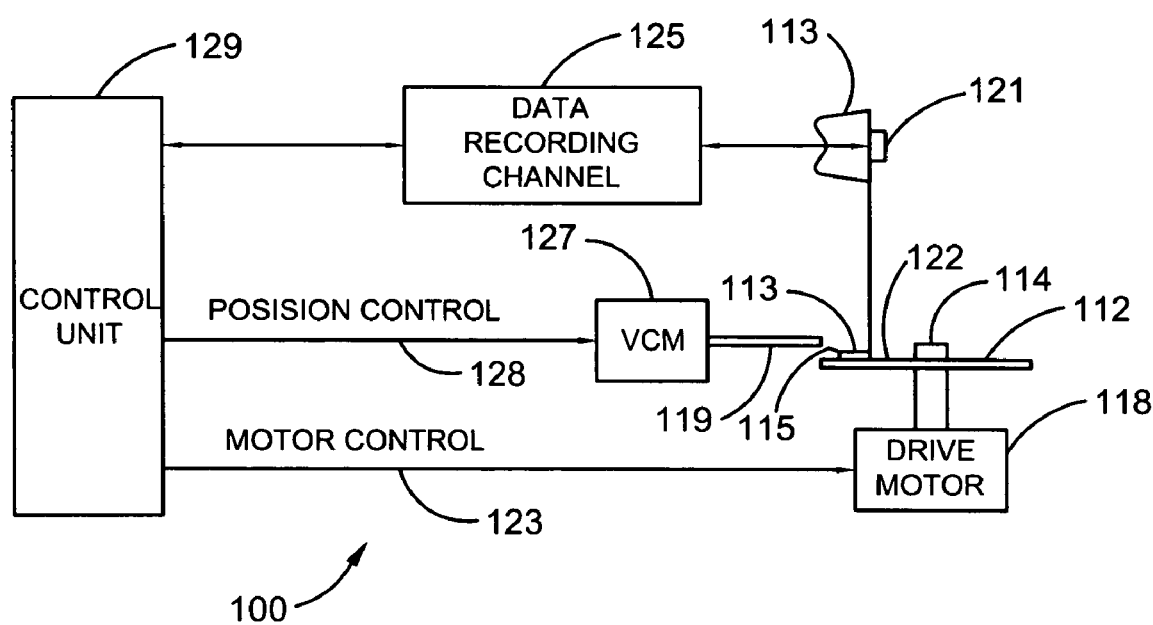
FIG. 1 is an illustrative representation of a disk drive which may employ a side-by-side read/write head which is made by use of the techniques described herein.

FIG. 1 is an illustrative representation of a disk drive 100 which may include a side-by-side magnetic read/write head 121 made using techniques of the present application. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on disk 112. At least one slider 113 is positioned on the disk 112, each slider 113 supporting a side-by-side magnetic read/write head 121. As the disks rotate, slider 113 is moved radially in and out over disk surface 122 so that head 121 may access different portions of the disk where desired data is read or recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 (the surface of slider 113 which includes head 121 and faces the surface of disk 112 is referred to as an air bearing surface (ABS)) and disk surface 122 which exerts an upward force or lift on the slider. The air bearing thus counter-balances the slight spring force of suspension 115 and supports slider 113 off and slightly above the disk surface by a small, substantially constant spacing during normal operation. The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write head 121 by means of recording channel 125.

FIGS. 2-20 are several illustrations which show a partially-fabricated side-by-side read/write head being made in accordance with the methods described herein, preferably in the order presented. The methods may be used to make the side-by-side read/write head in the disk drive shown and described in relation to FIG. 1. A side-by-side read/write head is one in which is the read head and write head are formed side-by-side in the same plane of the wafer. In the side-by-side read/write head made in accordance with the present method, the write head is of the perpendicular recording type which includes a trailing shield structure.

Figure 2:
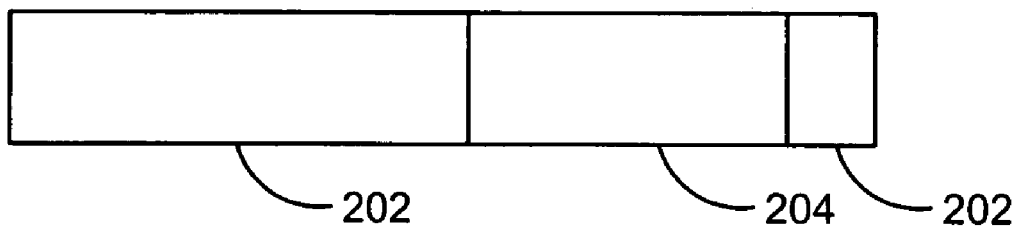
FIG. 2 is the first of a plurality of illustrations in FIGS. 2-20 showing a partially-fabricated side-by-side read/write head being made in accordance with the methods described herein, preferably in the order presented, where a shield layer for a read sensor is formed within a non-magnetic layer.

Beginning with reference to FIG. 2, a non-magnetic layer 202 is coplanar with a magnetic layer 204. Non-magnetic layer 202 may be made of any suitable non-magnetic material, such as alumina ($Al_2O_3$). The coplanar magnetic material 204 may be an electroplated ferromagnetic metal, which may serve as a magnetic shield for the magnetic head. This magnetic shield layer 204 may further serve as a lead in a CPP type sensor. The magnetic material may be or include nickel-iron (NiFe), cobalt-iron (CoFe), or alloys thereof. A planarization process such as a chemical-mechanical polishing (CMP) may be performed over the top of the structure to form a top planarized surface. The underlying layers which include the substrate are not shown in FIG. 2.

Figure 3:
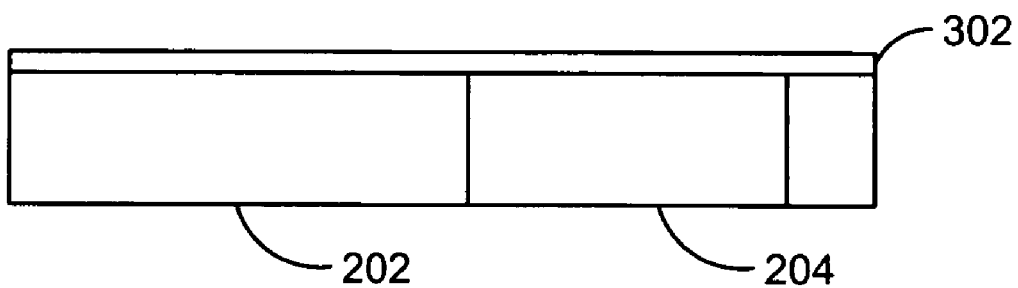
FIG. 3 is a second cross-sectional illustration of the partially-fabricated magnetic head of FIGS. 2-20, which is the same as that shown and described in relation to FIG. 2 except that a plurality of read sensor layers are formed over the non-magnetic layer and the shield layer.
Figure 4:
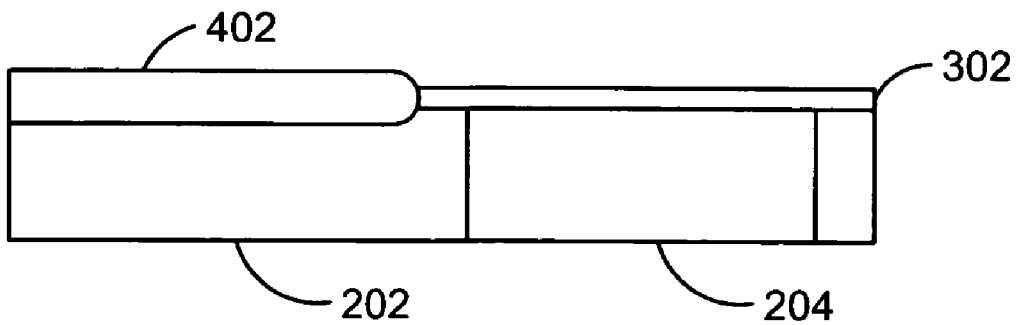
FIG. 4 is a third cross-sectional illustration of the partially-fabricated magnetic head of FIGS. 2-20, which is the same as that shown and described in relation to FIG. 3 except that magnetic pole tip structure materials are formed over the non-magnetic layer.

In FIG. 3 it is shown that a plurality of read sensor layers 302 are deposited in full film over the structure of FIG. 2. The read sensor layers 302 may include layers of a GMR or TMR sensor, for example, which may include a free layer structure, a ferromagnetic (FM) pinned structure (e.g. an antiparallel pinned structure), an antiferromagnetic (AFM) layer for pinning, etc. For a CPP-type sensor, the read sensor layers may be formed directly on magnetic shield layer 204; for a CIP-type sensor, an intervening non-magnetic ("read gap") layer may be formed between magnetic shield layer 204 and read sensor layers 302. In FIG. 4 it is shown that magnetic pole materials 402 for a pole tip structure are formed above the non-magnetic layer 202. These magnetic pole materials 402 may be formed by an electroplating step or sputtering within a suitable patterned resist. Magnetic pole materials 402 may be or include nickel-iron (NiFe), cobalt-iron (CoFe), or alloys thereof. Magnetic pole materials 402 may be formed to a thickness of between about 500 and 2,500 Angstroms.

Figure 5:
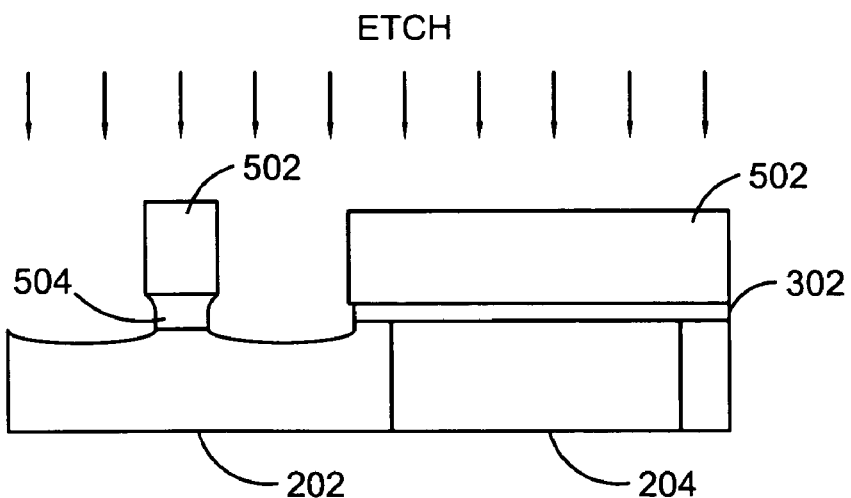
FIG. 5 is a fourth cross-sectional illustration of the partially-fabricated magnetic head of FIGS. 2-20, which is the same as that shown and described in relation to FIG. 4 except that the magnetic pole tip materials are etched to form a pole tip structure with use of a patterned polymer.

In FIG. 5, it is shown that a patterned polymer 502 is formed over the structure of FIG. 4 and an etching process is performed to remove magnetic pole materials so as to form a pole tip structure 504. As shown, patterned resist 502 includes two portions formed over the structure: a first polymer portion which protects portions of magnetic pole materials 402 and a second polymer portion which protects read sensor layers 302. Patterned polymer 502 may be made of a polymide-like material, for example, which is initially spun-on the top surface of the structure. This polymer layer may be formed to a thickness of about 1000 and 10,000 Angstroms. The etching process used to form the polymer layer into the patterned polymer 502 may be a reactive ion etch (RIE) using an oxygen containing plasma.

Figure 6:
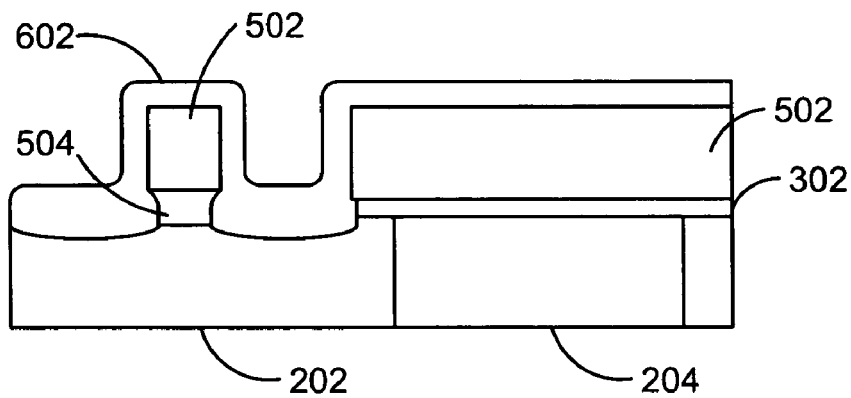
FIG. 6 is a fifth cross-sectional illustration of the partially-fabricated magnetic head of FIGS. 2-20, which is the same as that shown and described in relation to FIG. 5 except that an insulator is formed over the entire structure including the patterned polymer.
Figure 7:
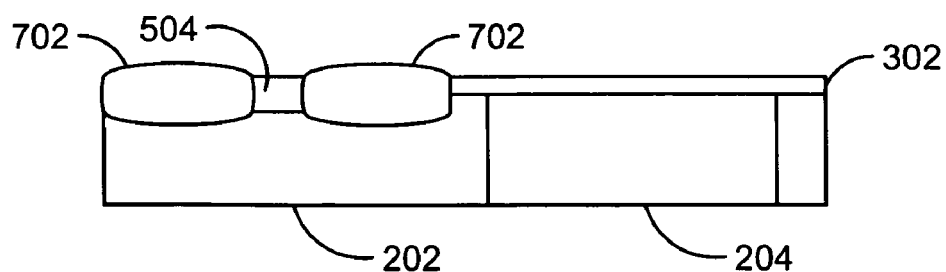
FIG. 7 is a sixth cross-sectional illustration of the partially-fabricated magnetic head of FIGS. 2-20, which is the same as that shown and described in relation to FIG. 6 except that a CMP is used to expose the patterned polymer which is removed with a solvent, where the insulator remains formed only around the pole tip structure.

In FIG. 6, it is shown that a non-magnetic layer 602 is then deposited over the entire structure with patterned polymer 502 maintained in place. Non-magnetic layer 602 may be made of any suitable non-magnetic material, and is preferably an oxide such as $SiO_2$ or $Al_2O_3$. This non-magnetic layer 602 may be formed to a thickness of about 500 and 1,000 Angstroms. A CMP is then performed over the top of the structure until the patterned polymer is exposed, at which time a suitable solvent is applied in order to dissolve it. After the patterned polymer is dissolved, the CMP is continued until the resulting structure of FIG. 7 is produced. As shown in FIG. 7, the patterned polymer is completely removed and non-magnetic materials 702 are formed only around pole tip structure 504.

Figure 8:
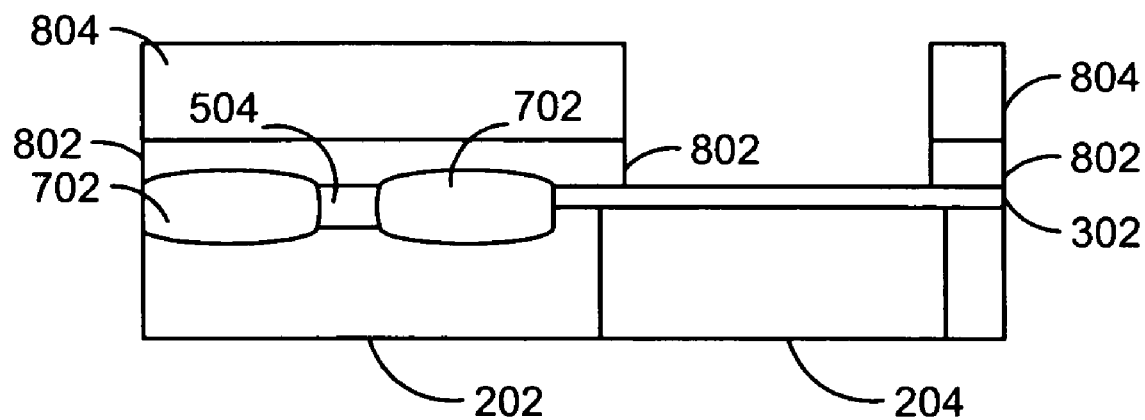
FIG. 8 is a seventh cross-sectional illustration of the partially-fabricated magnetic head of FIGS. 2-20, which is the same as that shown and described in relation to FIG. 7 except that a first non-magnetic layer is deposited over the pole tip structure with a resist used to shield the read sensor layers from the deposition.
Figure 9:
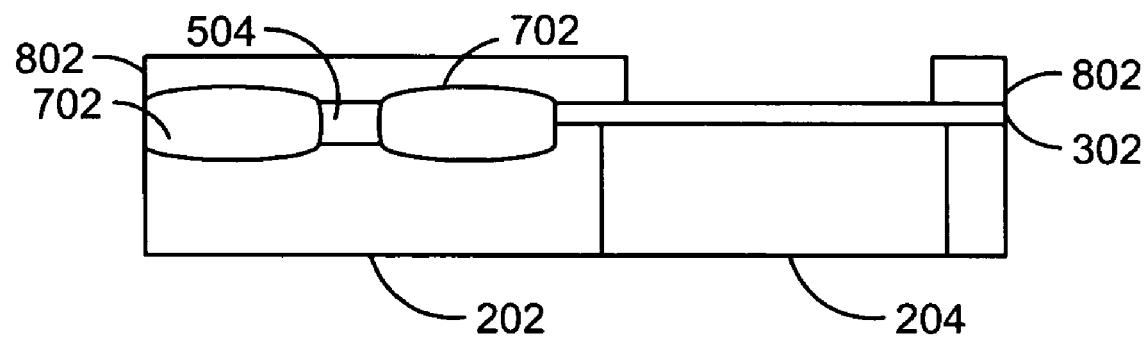
FIG. 9 is an eighth cross-sectional illustration of the partially-fabricated magnetic head of FIGS. 2-20, which is the same as that shown and described in relation to FIG. 8 except that the resist used to shield the read sensor layers from the deposition is removed.

A first non-magnetic layer is then deposited in full film over the structure, followed by the formation of a resist layer on top of it. The first non-magnetic layer may be made of any suitable non-magnetic material, preferably an oxide such as $SiO_2$ or $Al_2O_3$, which is formed to a thickness of between about 500 and 5,000 Angstroms. After its formation, the resist layer is patterned so as to expose the top of first non-magnetic layer materials lying directly above the read sensor layers. This is followed by an etching step, with the patterned resist in place, to remove the first non-magnetic materials lying above the read sensor layers or a sacrificial layer above the sensor. Preferably, the etching is a wet etch which has little or no effect on other surrounding non-magnetic materials. The resulting structure is illustrated in FIG. 8, showing a first non-magnetic layer 802 formed over the pole tip structure with a patterned resist 804 formed over it. The top of read sensor layers 302 is exposed after the wet etch. FIG. 9 is the same as that shown in FIG. 8, except that the patterned resist is shown as removed in FIG. 9 to expose the top of read sensor layers 302.

Figure 10:
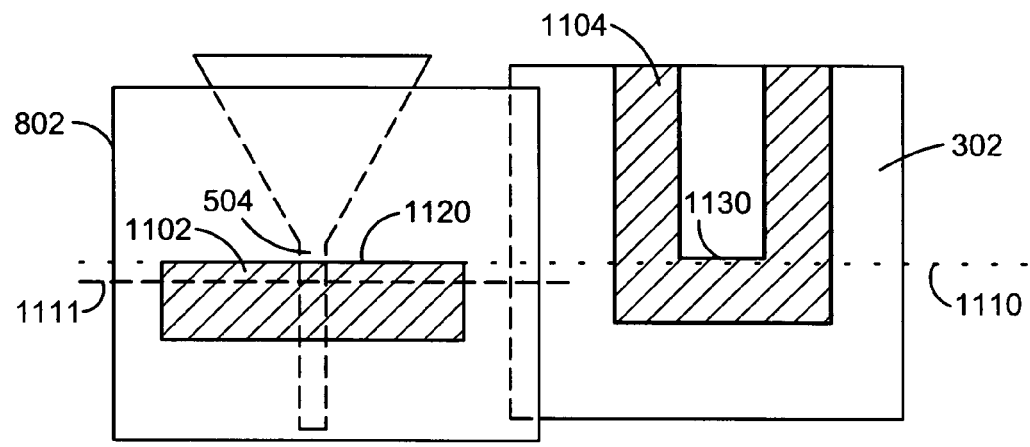
FIG. 10 is a ninth top-down illustration of the partially-fabricated magnetic head of FIGS. 2-20, which is the same as that shown and described in relation to FIG. 9 except that a first patterned resist for etching is shown formed over the first non-magnetic layer above the pole tip structure and the read sensor layers.

In the top-down view of FIG. 10, a first patterned resist is formed over first non-magnetic layer 802 above pole tip structure 504 as well as over read sensor layers 302. In this embodiment, the first patterned resist has two components: a first resist component 1102 which covers a portion of first non-magnetic layer 802 over pole tip structure 504 and a second resist component 1104 which covers a portion of read sensor layers 302. Note that first and second resist components 1102 and 1104 of the first patterned resist are formed in the same lithography process step. This way, rear edges 1120 and 1130 defined by the first patterned resist may be properly aligned 1110 as desired. Rear edge 1120 of first resist component 1102 is positioned so as to define a rear edge of a trailing shield which will be formed around the pole tip. On the other hand, rear edge 1130 of second resist component 1104 is positioned so as to define a rear edge of a read sensor which will be formed. It is noted that the alignment 1110 for the rear edges of the structures may or may not fall along the same plane. For example, a plane 1110 for the rear edge of the read sensor may be offset from a plane 1111 for the rear edge of the trailing shield by a predetermined distance.

Figure 11:
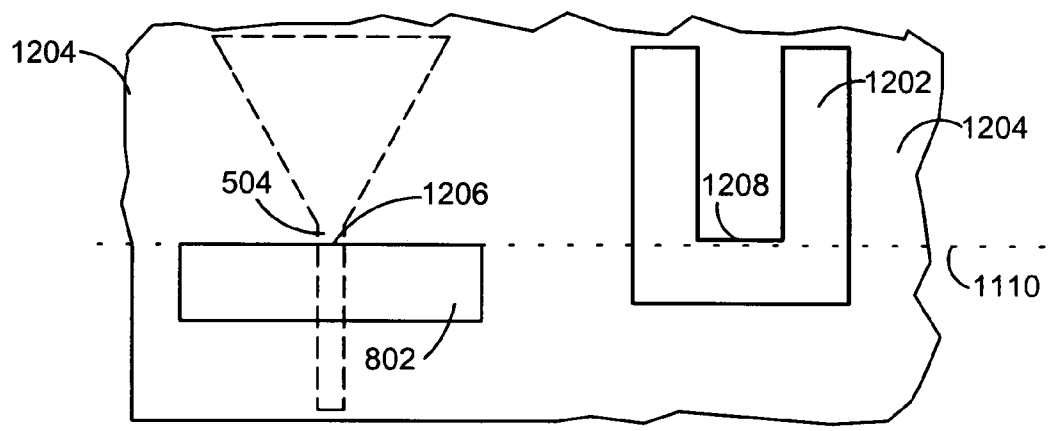
FIG. 11 is a tenth top-down illustration of the partially-fabricated magnetic head of FIGS. 2-20, which is the same as that shown and described in relation to FIG. 10 except that a rear edge of a read sensor and an etched region having a rear edge for a trailing shield are simultaneously defined by an etching step, a second non-magnetic layer is deposited behind the rear edge of the read sensor and within the etched region, and the first patterned resist is removed.

In the top-down view of FIG. 11, an etching step is therefore performed to simultaneously define an etched region having a rear edge 1206 for a trailing shield and a rear edge 1208 of a read sensor. This etching step may be an ion milling step. After the etching, a second non-magnetic layer 1204 is deposited within the etched region along rear edge 1206 of the trailing shield as well as behind rear edge 1208 of the read sensor, and the first patterned resist is removed. Second non-magnetic layer 1204 may be any suitable non-magnetic material, and is preferably and oxide (e.g. $SiO_2$ or $Al_2O_3$) which may be different from first non-magnetic layer 802. Second non-magnetic layer 1204 may be formed to a thickness of between about 100 and 1,000 Angstroms.

Thus, from the steps of FIGS. 10-11, the rear edge of the trailing shield is defined at the same time as the rear edge of the read sensor. Thus, the rear edges for these structures may be positioned relative to one another or aligned as desired. The rear edges for these structures may be in direct alignment with each other or, alternatively, offset by a predetermined distance from each other.

Figure 12:
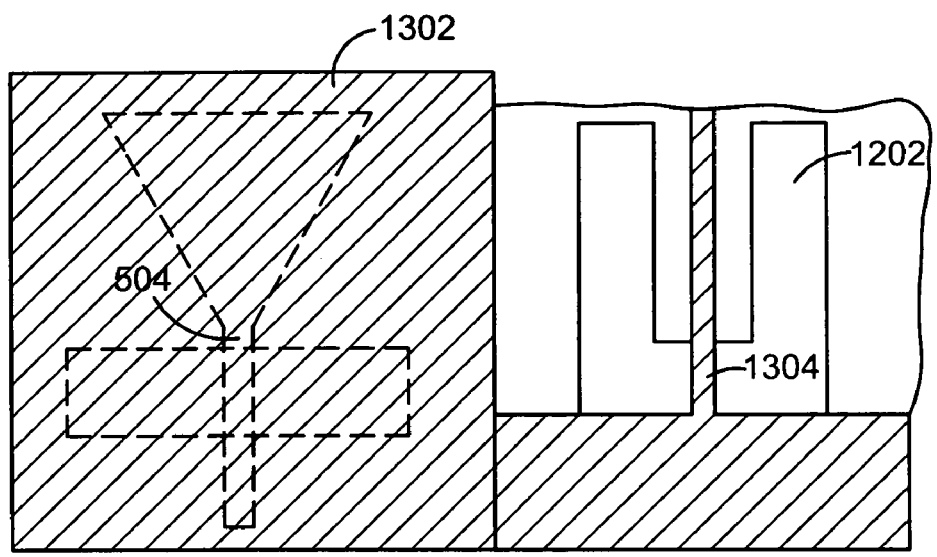
FIG. 12 is an eleventh top-down illustration of the partially-fabricated magnetic head of FIGS. 2-20. which is same as that shown and described in relation to FIG. 11 except that a second patterned resist is formed over the read sensor layers and the pole tip structure for etching.

In the top-down view of FIG. 12, a second patterned resist is formed over the entire pole tip structure 504 area as well as partially over read sensor layers 302. In this embodiment, the second patterned resist has two components: a first resist component 1302 which covers the entire pole tip structure 504 area and a second resist component 1304 which covers a portion of read sensor layers 302. Note that first and second resist components 1302 and 1304 of the second patterned resist are formed in the same lithography process at the same time. Second resist component 1304 is formed as a thin rectangular piece as shown; left and right edges of second resist component 1304 are formed so as to help define an appropriate trackwidth (TW) for the read sensor. The trackwidth may be formed to be between about 10 and 100 nm.

Figure 13:
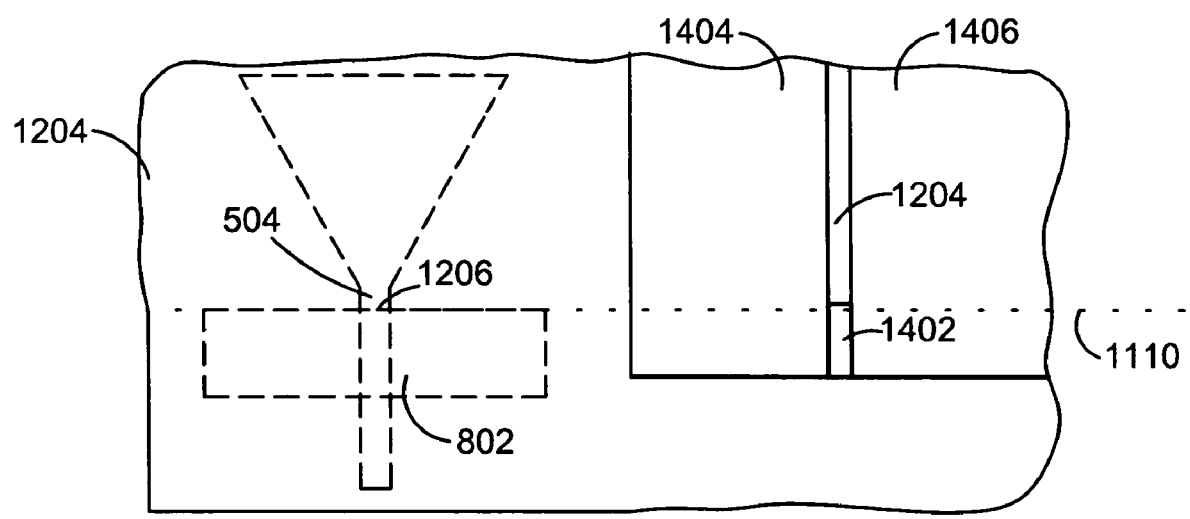
FIG. 13 is a twelfth top-down illustration of the partially-fabricated magnetic head of FIGS. 2-20, which is the same as that shown and described in relation to FIG. 12 except that an etching step is performed with use of the second patterned resist to define left and right edges (i.e. the trackwidth) of the read sensor, and hard bias and lead layers are formed adjacent to the read sensor.
Figure 14:
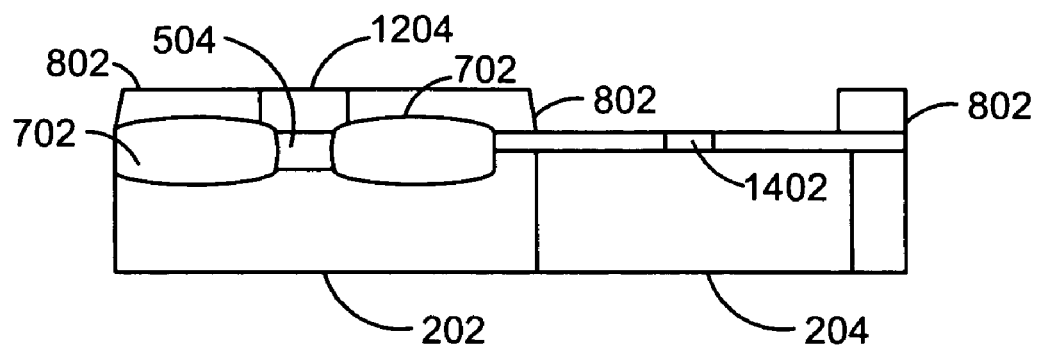
FIG. 14 is a thirteenth cross-sectional illustration of the partially-fabricated magnetic head of FIGS. 2-20, which is the same as that shown and described in relation to FIG. 13 except that it shows the trackwidth defined for the read sensor from the etching step of FIG. 14.

In FIG. 13, an etching step is performed to therefore define the trackwidth of a newly-formed read sensor 1402. This etching step may be an ion milling process. After the etching, hard bias and lead layers 1404 and 1406 may be deposited around the left and right sides of read sensor 1402. Alternatively, the materials deposited around the left and right sides of read sensor 1402 may be non-magnetic insulator materials (e.g. for a CPP-type sensor). The second patterned resist is then removed, the result of which is shown in FIG. 13; FIG. 14 is the same as FIG. 13 except in cross-sectional view.

Figure 15:
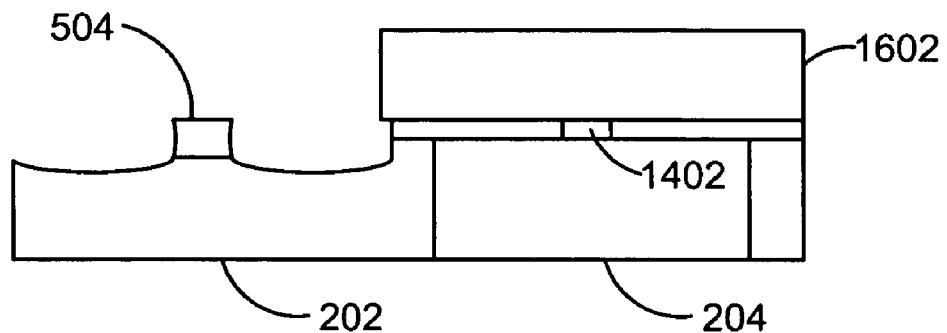
FIG. 15 is a fourteenth cross-sectional illustration of the partially-fabricated magnetic head of FIGS. 2-20, which is the same as that shown and described in relation to FIG. 14 except that a resist is formed over the read sensor and an etching step is performed to remove second non-magnetic materials which surround the pole tip structure so as to define an etched trailing shield region.
Figure 16:
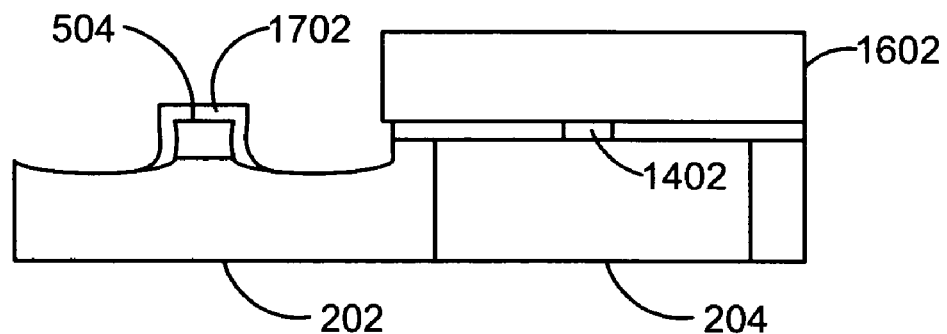
FIG. 16 is a fifteenth cross-sectional illustration of the partially-fabricated magnetic head of FIGS. 2-20, which is the same as that shown and described in relation to FIG. 15 except that a non-magnetic gap materials are formed to surround the pole tip of the pole tip stricture.
Figure 17:
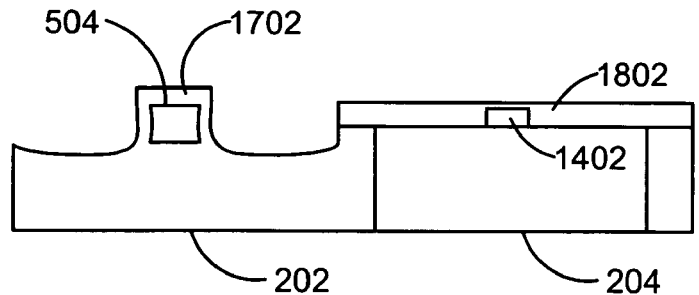
FIG. 17 is a sixteenth cross-sectional illustration of the partially-fabricated magnetic head of FIGS. 2-20, which is the same as that shown and described in relation to FIG. 16 except that a gap layer is formed over the read sensor.

In FIG. 15, a patterned resist 1602 is formed over read sensor 1402 and an etching process is performed to remove all of the non-magnetic materials surrounding the pole tip structure 504 near the pole tip as shown. Read sensor 1402 and its surrounding region are protected by patterned resist 1602 during the etching process. The etching process to remove the oxide materials around pole tip structure 504 is preferably a RIE using a fluorine containing plasma. In FIG. 16, a non-magnetic gap layer 1702 is formed so as to surround pole tip structure 504 (i.e. surrounding its top and left and right sides). This may be done by the application of a patterned resist for the gap layer and the deposition of non-magnetic materials within the patterned resist. The non-magnetic gap layer 1702 may be formed to a thickness of between about 50 and 500 Angstroms. During the deposition and etching, read sensor 1402 and its surrounding region are protected by patterned resist 1602. In FIG. 17, the resist formed over read sensor 1402 is then removed and a non-magnetic read gap layer 1802 is deposited over the top of read sensor 1402. This is an optional step for read sensor 1402, as it may be of the CPP type which is supposed to make electrical contact with a top shield/lead layer. This deposition step may also simultaneously form an additional layer for gap layer 1702 of pole tip structure 504, where the previously-formed patterned resist for gap layer 1702 is kept in place.

Figure 18:
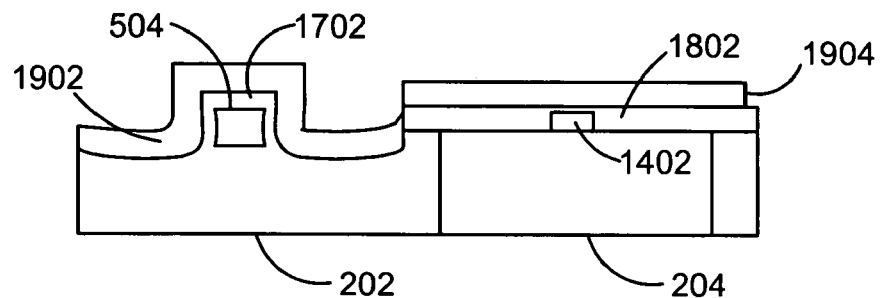
FIG. 18 is a seventeenth cross-sectional illustration of the partially-fabricated magnetic head of FIGS. 2-20, which is the same as that shown and described in relation to FIG. 17 except that magnetic materials are formed within the etched trailing shield region to form a trailing shield which has the rear edge defined from previous steps above.
Figure 19:
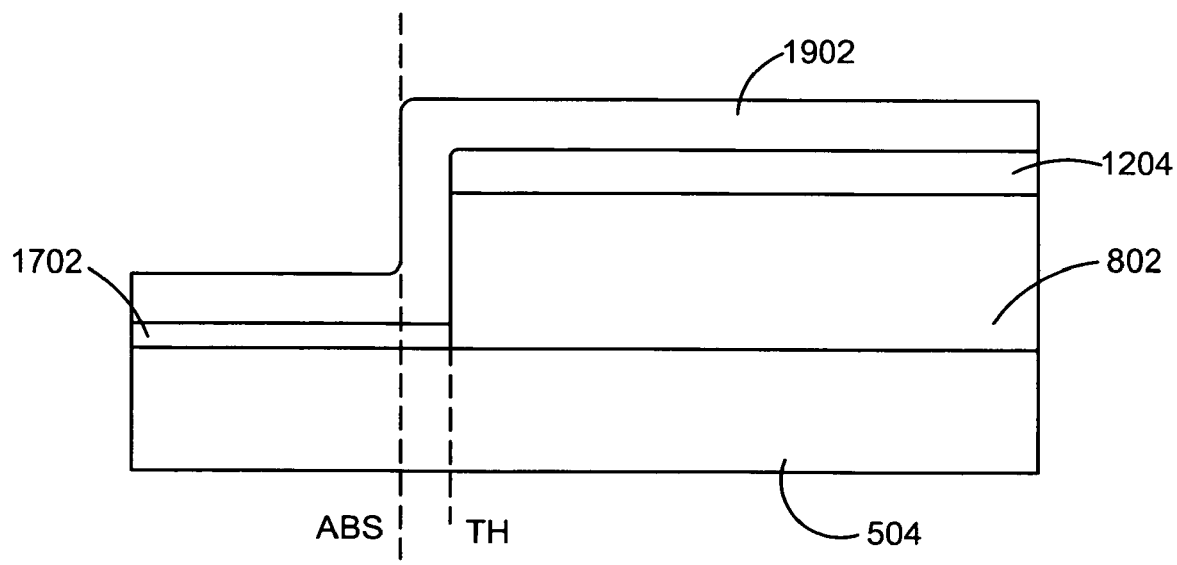
FIG. 19 is an eighteenth cross-sectional illustration of the partially-fabricated magnetic head of FIGS. 2-20, which is the same as that shown and described in relation to FIG. 18 except showing the rear edge of the trailing shield and the air bearing surface 1 (ABS) of the magnetic head.

In FIG. 18, magnetic trailing shield materials are deposited over the structure so as to form a trailing shield structure 1902. These magnetic materials may be, for example, nickel-iron (NiFe), cobalt-iron (CoFe), or alloys thereof Trailing shield structure 1902 has a rear edge (not visible in FIG. 18) defined from previous steps (see FIGS. 10-13). Note that underlying seed layer materials may be deposited prior to formation of the trailing shield. The step of FIG. 18 may also simultaneously form a magnetic shield/lead layer 1904 (and any underlying seed layers) over read sensor 1402. Trailing shield structure 1902 is formed so as to extend behind its rear edge over most of pole tip structure 504, on top of non-magnetic oxide material. See FIG. 19. Preferably, trailing shield 1902 is formed to a thickness of between 200 and 2,000 Angstroms. After remaining steps to complete the magnetic head, conventional or otherwise, the wafer is cut and lapped at the ABS shown in FIG. 19. As shown, a non-magnetic etchable layer (e.g. oxide material) is formed behind the ABS and the trailing shield structure, and is coplanar with the trailing shield structure. The read sensor has a rear edge which may be aligned with or offset from a rear edge of the trailing shield by a predetermined distance.

Final Comments. The techniques described herein are suitable for making a side-by-side read/write head, where the write head is of the perpendicular-recording type. A side-by-side read/write head is one in which the read head and write head are formed side-by-side in the same plane of the wafer. Broadly, a trailing shield of the write head is formed so as to be self-aligned with a read sensor formed for the read head. Specifically, a rear edge of the trailing shield is defined by the same lithography/etch process used to define a rear edge of the read sensor. As the read head and the write head are formed in an aligned fashion, process windage and mechanical lapping control define the location of the read and write elements. This creates reduced process variations in terms of the relative orientation of the read head and the write head to the ABS plane.

In one specific approach, a plurality of read sensor layers and a pole tip structure adjacent the read sensor layers are formed over a wafer. A first non-magnetic layer (e.g. $SiO_2$) is deposited over the pole tip structure. A first patterned resist is then formed over both the read sensor layers and the first non-magnetic layer. With the first patterned resist in place, read sensor materials of the read sensor layers are etched away so as to define a rear edge of a read sensor. Simultaneously, first non-magnetic materials of the first non-magnetic layer are etched away so as to form an etched region which defines a rear edge for a trailing shield. With the first patterned resist in place, a second non-magnetic layer (e.g. $Al_2O_3$) is deposited within the etched region and behind the rear edge of the read sensor structure. After forming a trackwidth (TW) for the read sensor, first non-magnetic materials of the first non-magnetic layer are etched away so as to form an etched trailing shield region which defines the rear edge for the trailing shield. Non-magnetic gap materials are then formed to surround a pole tip of the pole tip structure. Finally, magnetic materials are formed within the etched trailing shield region around the non-magnetic gap materials, for thereby producing the self-aligned trailing shield.

A magnetic head of the present application includes a read head and a write head which is coplanar with the read head. The write head includes a pole tip of the perpendicular recording type being formed at an air bearing surface (ABS) of the magnetic head; a trailing shield structure formed so as to surround the pole tip; and a non-magnetic etchable layer (e.g. an oxide) formed behind the ABS and the trailing shield structure and being coplanar with the trailing shield structure. A read sensor of the read head has a rear edge which may be aligned with or offset from a rear edge of the trailing shield by a predetermined distance. A disk drive of the present application includes one or more magnetic disks; a side-by-side read/write head for reading data from and writing data to the one or more magnetic disks; a slider which supports the side-by-side read/write head; and an actuator arm which supports the slider. The write head includes a pole tip of the perpendicular recording type being formed at an air bearing surface (ABS) of the magnetic head;

a trailing shield structure formed so as to surround the pole tip; and a non-magnetic etchable layer (e.g. an oxide) formed behind the ABS and the trailing shield structure and being coplanar with the trailing shield structure. A read sensor of the read head has a rear edge which may be aligned with or offset from a rear edge of the trailing shield by a predetermined distance.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special particular meaning different from the plain language meaning, and therefore the specification is not to be used to define terms in an unduly narrow sense.

What is claimed is:

1. A method of making a side-by-side read/write head comprising the acts of:
    forming, over a wafer, a plurality of read sensor layers and a pole tip structure adjacent the read sensor layers;
    depositing a first non-magnetic layer over the pole tip structure;
    forming a patterned resist over the read sensor layers and the first non-magnetic layer; and
    etching away, with the patterned resist in place, read sensor materials of the read sensor layers and first non-magnetic materials of the first non-magnetic layer such that:
        a rear edge of a read sensor is defined; and
        a rear edge of a trailing shield to be formed is defined.

2. The method of claim 1, wherein the rear edge of the read sensor and the rear edge of the trailing shield to be formed are simultaneously defined by the act of etching.

3. The method of claim 1, wherein the act of etching away to define the rear edge of the read sensor forms a stripe height of the read sensor.

4. The method of claim 1, wherein the first non-magnetic layer comprises an oxide material.

5. The method of claim 1, further comprising:
    wherein the act of etching away comprises the further act of forming an etched region within the first non-magnetic layer which defines the rear edge of the trailing shield to be formed;
    depositing, with the patterned resist in place, a second non-magnetic layer within the etched region;
    removing the patterned resist;
    etching to remove first non-magnetic materials of the first non-magnetic layer to form an etched trailing shield region which defines the rear edge of the trailing shield to be formed; and
    forming magnetic materials within the etched trailing shield region to form the trailing shield along the rear edge.

6. The method of claim 5, wherein the magnetic materials of the trailing shield comprise at least one of nickel-iron (NiFe) and cobalt-iron (CoFe).

7. The method of claim 5, wherein the first and the second non-magnetic materials comprise oxide materials.

8. The method of claim 5, wherein the first non-magnetic layer comprises materials different from the second non-magnetic layer.

9. The method of claim 5, wherein the act of etching to remove the first non-magnetic materials comprises the act of reactive ion etching (RIE).

10. The method of claim 1, wherein the patterned resist comprises a first patterned resist, the method further comprising:
    wherein the act of etching away comprises the further act of forming an etched region within the first non-magnetic layer which defines the rear edge of the trailing shield to be formed;
    depositing, with the patterned resist in place, a second non-magnetic layer within the etched region;
    removing the first patterned resist;
    forming a second patterned resist over the read sensor layers; and
    etching away, with the second patterned resist in place, read sensor materials so as to form a trackwidth (TW) of the read sensor.

11. The method of claim 1, wherein the patterned resist comprises a first patterned resist, the method further comprising:
    wherein the act of etching away comprises the further act of forming an etched region within the first non-magnetic layer which defines the rear edge of the trailing shield to be formed;
    depositing, with the patterned resist in place, a second non-magnetic layer within the etched region;
    removing the patterned resist;
    forming a second patterned resist over the read sensor layers;
    etching away, with the second patterned resist in place, read sensor materials so as to form a trackwidth (TW) of the read sensor;
    removing the second patterned resist;
    etching to remove first non-magnetic materials of the first non-magnetic layer to form an etched trailing shield region which defines the rear edge of the trailing shield to be formed;
    forming non-magnetic gap materials to surround a pole tip of the pole tip structure; and
    forming magnetic materials within the etched trailing shield region to form the trailing shield along the rear edge.

12. The method of claim 11, wherein the first and the second non-magnetic materials comprise oxide materials and the magnetic materials of the trailing shield comprise one of nickel-iron (NiFe) and cobalt-iron (CoFe).

13. A method of making a side-by-side read/write head comprising the acts of:
    forming, over a wafer, a plurality of read sensor layers and a pole tip structure adjacent the read sensor layers;
    depositing a first non-magnetic layer over the pole tip structure;
    forming a first patterned resist over the read sensor layers and the first non-magnetic layer; and
    etching away, with the first patterned resist in place, read sensor materials of the read sensor layers and first non-magnetic materials of the first non-magnetic layer such that:
        a rear edge of a read sensor is defined; and
        an etched region within the first non-magnetic layer is defined with a rear edge for a trailing shield;
    depositing, with the first patterned resist in place, a second non-magnetic layer within the etched region and along the rear edge of the read sensor;
    removing the first patterned resist;
    forming a second patterned resist over the read sensor layers; and etching away, with the second patterned resist in place, read sensor materials so as to form a trackwidth (TW) of the read sensor.

14. The method of claim 13, wherein the rear edge of the read sensor and the rear edge for the trailing shield are simultaneously defined by the act of etching.

15. The method of claim 13, wherein the act of etching away to define the rear edge of the read sensor forms a stripe height of the read sensor.

16. The method of claim 13, wherein the first non-magnetic layer comprises an oxide material.

17. The method of claim 13, wherein the first non-magnetic layer comprises materials different from the second non-magnetic layer.

18. The method of claim 13, further comprising:
etching to remove first non-magnetic materials of the first non-magnetic layer to form an etched trailing shield region which defines the rear edge of the trailing shield to be formed; and
forming magnetic materials within the etched trailing shield region to form the trailing shield along the rear edge.

19. The method of claim 13, further comprising:
etching to remove first non-magnetic materials of the first non-magnetic layer to form an etched trailing shield region which defines the rear edge of the trailing shield to be formed;
forming non-magnetic gap materials so as to surround a pole tip of the pole tip structure; and
forming magnetic materials within the etched trailing shield region and around the non-magnetic gap materials to form the trailing shield along the rear edge.

20. The method of claim 19, wherein the magnetic materials of the trailing shield comprise at least one of nickel-iron (NiFe) and cobalt-iron (CoFe).

* * * * *